Oct. 9, 1934.    O. J. FISCHER    1,976,280
DRYING MACHINE
Filed July 9, 1932    6 Sheets-Sheet 1

Inventor
Otto Johannes Fischer

Oct. 9, 1934.  O. J. FISCHER  1,976,280
DRYING MACHINE
Filed July 9, 1932  6 Sheets-Sheet 2
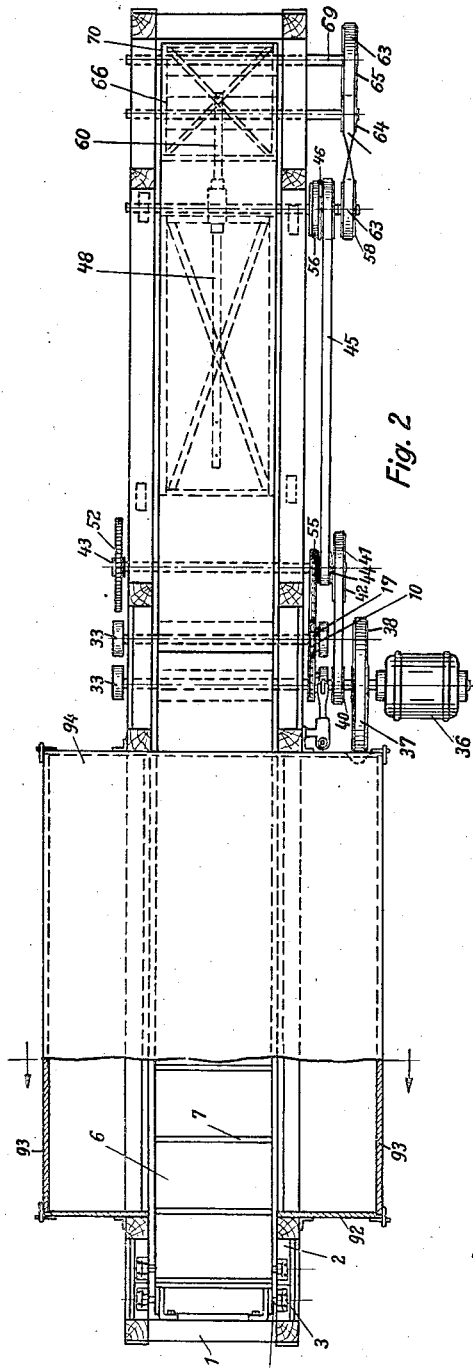
Fig. 2
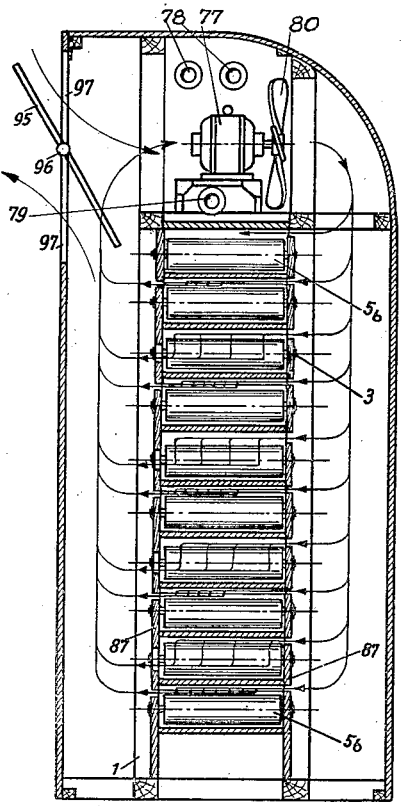
Fig. 3
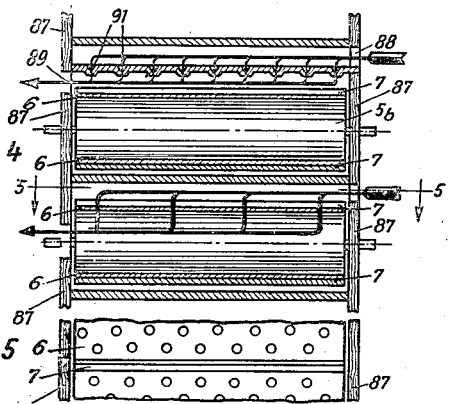
Fig. 4
Fig. 5
Inventor
Otto Johannes Fischer

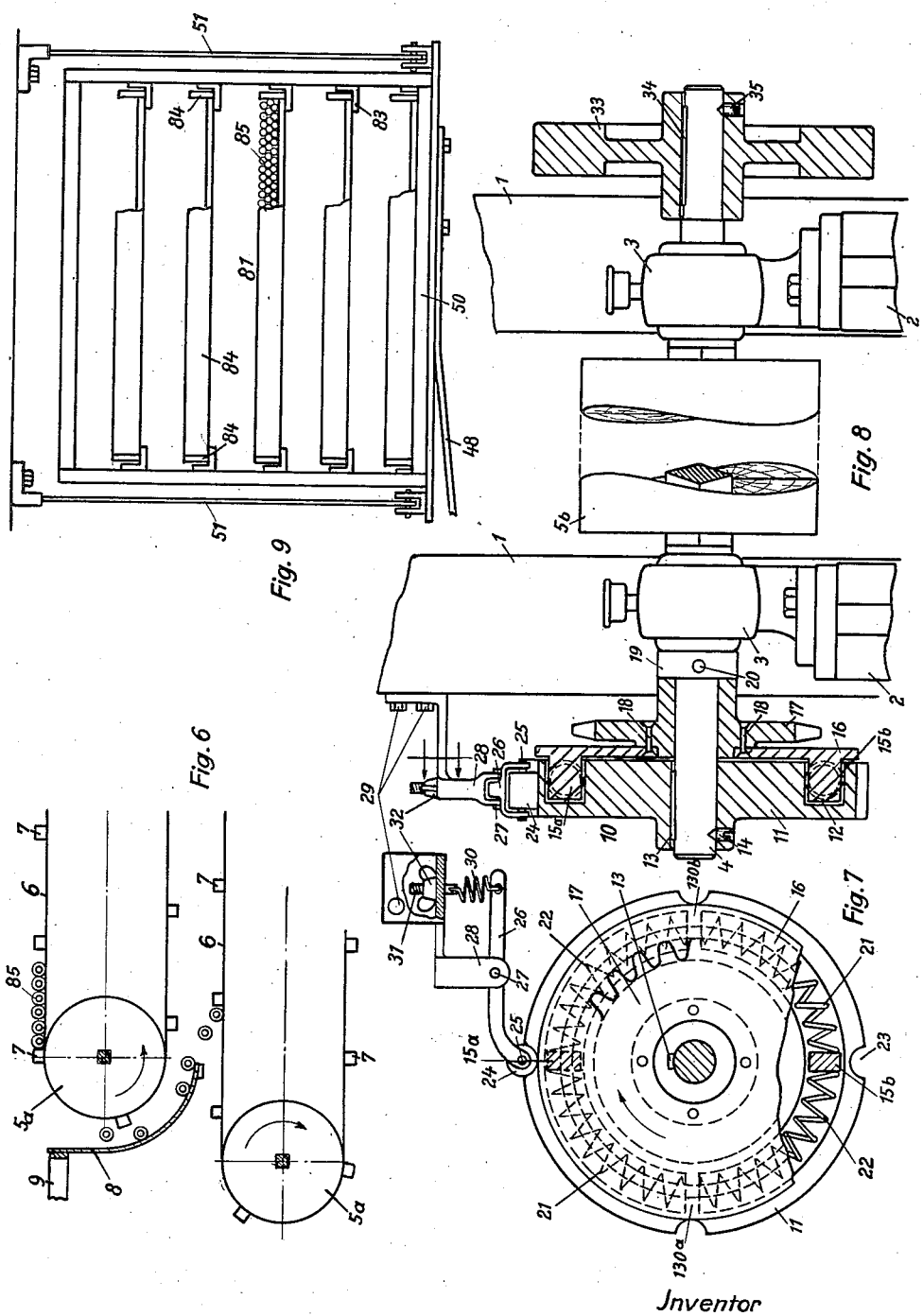

Oct. 9, 1934.   O. J. FISCHER   1,976,280
DRYING MACHINE
Filed July 9, 1932   6 Sheets-Sheet 5

Inventor
Otto Johannes Fischer

Oct. 9, 1934.    O. J. FISCHER    1,976,280
DRYING MACHINE
Filed July 9, 1932    6 Sheets-Sheet 6

Inventor
Otto Johannes Fischer

Patented Oct. 9, 1934

1,976,280

UNITED STATES PATENT OFFICE 1,976,280

DRYING MACHINE

Otto Johannes Fischer, Dohna, Germany

Application July 9, 1932, Serial No. 621,623
In Germany July 4, 1931

15 Claims. (Cl. 34—12)

The invention relates to machines for use in the drying of macaroni and similar rod or tube like doughy materials, and has for its object the provision of such a machine in which by means of endless transporting belts the moist material coming from the press in a plastic state, and for the purpose of drying, is guided through the machine. Care is taken to remove the moisture from the material in a most efficient way, also to prevent the macaroni from sticking together, getting crooked or receiving a cracked surface and an undesirable appearance by unequal drying.

One object of my invention is to provide such a drive or device in the machine that at equal or unequal intervals the said endless transporting belts are suddenly shaken in the direction of running or speed is suddenly changed so as to roll the macaroni, to and fro on the belt due to its inertia, and for forcing it in a straight line against bars fixed to the belt surface at right angles to the running direction at a suitable distance from each other.

Another object of my invention is to guide the artificial air current for drying the macaroni or the like in the machine that the air is blown at right angles to the direction of transport and is preferably conveyed first over or through the belts supporting the driest goods and then to the belts supporting the moister material.

Further it is another object of my invention to provide means in the said machine for automatically controlling the artificial moisture and temperature of the air current before it enters the belt device.

With the foregoing and other objects in view, the nature of my invention will be better understood from the following specification and accompanying drawings, wherein:

Figure 2 is a plan view, partially in section according to the line 2—2 of Figure 1.

Figure 3 is an end view in section on the line 3—3 of Fig. 1.

Figure 4 shows a view in detail of Figure 3 on an enlarged scale.

Figure 5 represents a plan view on the line 5—5 of Figure 4.

Figure 6 shows a diagrammatic fragmentary side view of two transporting belts one above the other.

Figure 7 is an elevational view of the clutch or coupling from the right in Figure 8 with parts broken away.

Figure 8 represents an elevation of a driving roller and the devices on its shaft in section.

Figure 9 is a back view of the shaking device for spreading the macaroni coming from the press.

Figure 1:
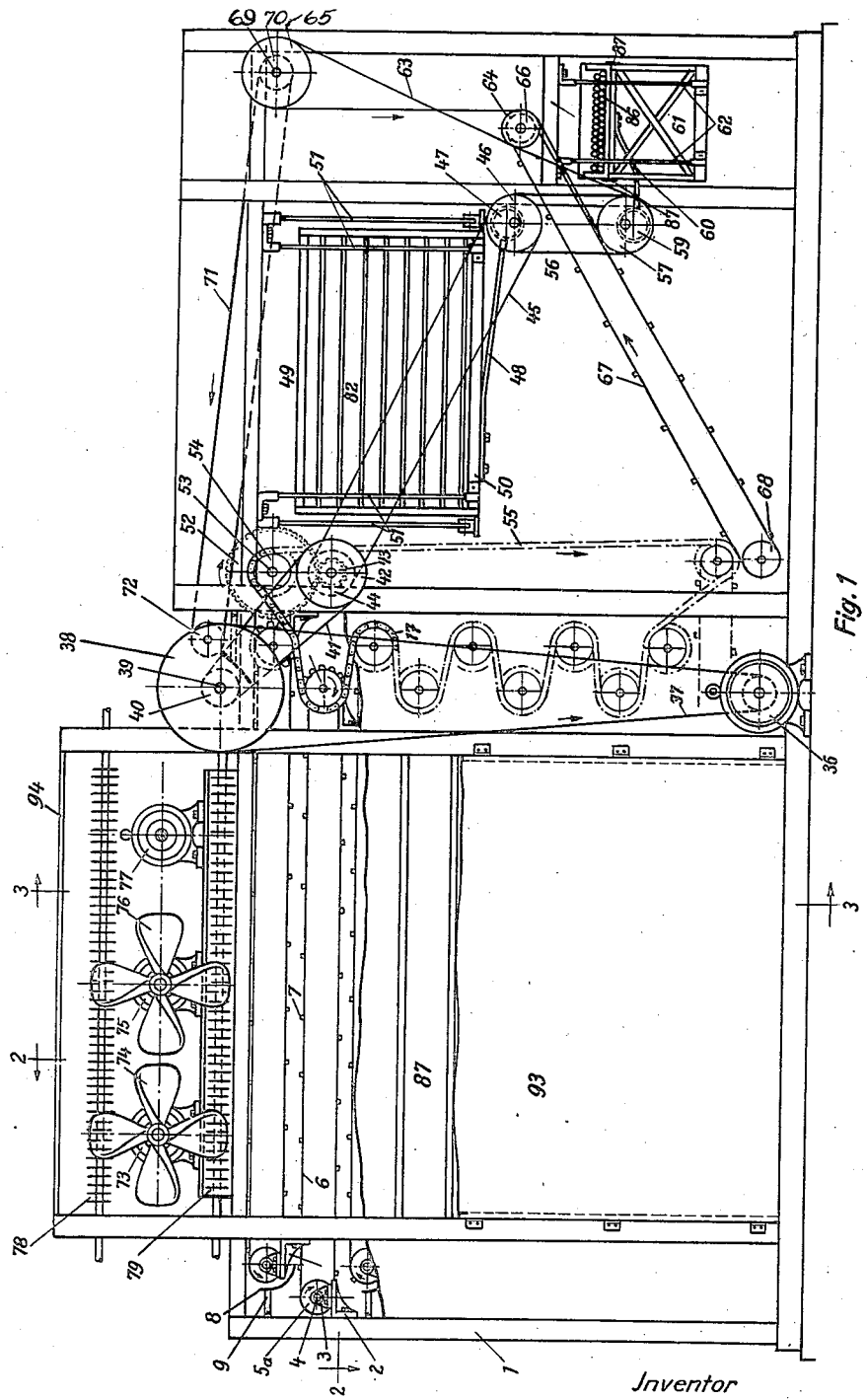
Figure 1 is a side elevational view of a machine embodying my invention, partially in elevation and partially in section.

Referring to the characters in the drawings the numeral 1 represents a framework which supports brackets 2 on each of which is arranged a bearing 3 for a shaft 4 of the rollers 5. Around each of two rollers, situated at the same height, a transporting belt is laid. The rollers 5a on the left of Figure 1 are only guiding rollers, whereas the rollers 5b on the right are the driving rollers for the transporting belts 6. On the transporting surface of each transporting belt 6 are attached bars 7 at right angles to the running direction as will appear more clearly from Figure 6. At a distance from the end roller of each transporting belt 6 a sheet-metal-guide 8 is arranged fixed to the framework 1 by means of a supporting member 9. As shown in Figure 2 on the front end of each shaft 4, which supports a driving roller 5b, a coupling 10 is arranged containing an accumulator of power as shown in detail in Figures 7 and 8. One half of the coupling is formed by a circular disc 11 having two recesses 12a and 12b in the form of two half circular collars with the same center-line but separated by bridging members 130a and 130b. The disc is fixed to the shaft 4 by means of a sunk key 13 and a set screw 14. Projections 15 of the circular disc 16 belonging to the other half of the clutch, extend into these recesses 12. The disc 16 is attached to the chain pulley 17 by rivets 18. This pulley per se may freely rotate on the shaft 4. For securing the right half of the clutch in its proper position on the shaft with regard to the left one, a sleeve 19 is arranged on the shaft 4 and attached to it by means of a bolt 20. Between the projections 15a and 15b of the disc 16 and the bridging members 130a and 130b in the circular collar-like recesses of the disc 11 pressure-springs 21 and 22 are inserted. At the circumference of the disc 11 are provided notches 23 for engaging a roll 24 for interlocking with the left half of the clutch. The roll 24 is pivoted to the double-lever 26 by means of the bolt 25. This lever is pivoted by means of a bolt 27 on the supporting member 28 which is attached by means of screws 29 to the framework 1. A spring engages the free end of the lever 26 and is fastened on its other end to a threaded bolt 31 which may be adjusted by a wing nut 32 for changing the tension of the spring 30. The shaft 4 supports on the other end a flywheel 33 secured to it by means of a sunk key 34 and a worm screw 35. The electric motor 36 drives by means of a belt 37 the pulley 38, on the shaft 39 of which is supported the pulley 40 connected with the pulley 42 by the belt 41. Fixed to the shaft of the pulley 42 are arranged a pinion 43 and the belt pulley 44. This pulley drives by means of a belt 45 the pulley 46, the shaft of which supports an eccentric 47 actuating through rod 48 the shaking device 49, which consists of the framework 50, suspended and capable of being swung by means of flat springs 51 on the framework 1 of the drying machine. The pinion 43 engages a larger gear wheel 52, the shaft 53 of which supports a chain pulley 54. Over this pulley and the chain-pulley 17 of all the shafts which support a driving roller 5b for the transporting belts 6 is laid only one endless pitch-chain 55 in such a way that all belts are moved in the proper direction. From the double belt pulley 46 a belt 56 leads to the pulley 57. A second pulley and an eccentric 59 are supported on the same shaft as is the pulley 57. The eccentric drives by means of a rod 60 a shaking-frame 61 which is suspended similar to 50 by means of flat springs 62 for the purpose of attaining a swinging motion. The pulley 58 drives simultaneously by means of the belt 63 the pulleys 64 and 65. This belt is crossed between each of two of the three pulleys. The shaft of the pulley 64 supports a roller 66 for driving the transporting belt 67. The leading roller of this belt is numbered 68. On the same shaft 69 as the pulley 65 is situated the driving roller 70 for the conveying belt 71 which also runs over the leading roller 72.

For producing an artificial current of air electric driven fans are provided. Fig. 1 shows an electric motor 73 with fan-blades 74, an electric motor 75 with fan-blades 76 and an electric motor 77 the fan-blades of which are not shown in Fig. 1 but may be seen in Fig. 3 as member 80. The tubes or pipes 78 and 79 form devices for cooling or heating the artificial air currents.

The working-method of the drying machine is as follows: After the macaroni is drawn from the press in the usual manner into a number of receptacles 81, arranged one after the other on a table, and has been cut between the receptacles whereas yet the macaroni lies in a disorderly condition, the receptacles are put into the spreading-device 49 as shown in Fig. 1 from the back side. This is clearly shown in Fig. 9 which represents a back view of the device 49. The device 49 consists therefore of a framework 50, which according to Fig. 1 is covered in front by boards 82, and of guide-bars 83, for the receptacles 81, on the inside of those walls which are at right angles to the direction of the shaking-movement. Each receptacle is open on that side which is put into the frame first, while the other 3 sides are provided with boards 84. Through the shaking of device 49 by means of the eccentric drive 47—48 the material in each receptacle is equably shaken and disposed. After a certain time, device 49 is set at rest by the release of a clutch not shown. One receptacle 81 is drawn out by hand and the contents are cast or thrown upon the conveying belt 71. The latter conveys the material in the direction of the arrow until it drops at the end of the belt and rolls over a sheet-metal-guide upon the first transporting belt of the drying device. The speed of the endless belts 6 is faster than that of the conveying belt 71 so that the dough-rods 85 drop in corresponding lesser amounts to the first of the belts 6, that is to say, the dough bars 85 must not fill the entire space between each of 2 cross bars 7 upon the transporting surface of 6, if they are resting in one layer, as is shown in Fig. 6.

The driving of each one of the transporting belts is as follows: The right half of the clutch, comprising the disc 16 and the chain-pulley 17, is driven by the pitch-chain as will be clearly explained with reference to Figs. 7 and 8. As is shown in Fig. 7, the left half of the clutch, formed by the disc 11 is still interlocked in its position by the roll 24. Upon turning 16 and 17 in a clock-wise direction the pressure springs 22 are compressed by the fixed projections 15a and 15b, and the springs 21 are able to expand. As soon as the energy, stored up in springs 22 has reached such a tension that the roll 24 is forced out of the notch, the left half of the clutch is suddenly thrown in a clockwise direction until the buffer-springs 21 catch it. Thereby these springs are stored-up with energy. As at this moment roll 24 rests against the cylindrical surface of disc 11 the pressure springs 21 can expand and cause a swinging backwards of that part of the clutch. This play is repeated until the free energy in the springs is lost. During this process a shaking of each belt is produced. This in turn causes the dough-bars to roll to and fro on account of their inertia. They are therefore at intervals set in a rolling motion so that they cannot stick together. Further this rolling motion causes them directly or indirectly to be stopped by the cross-bars, so that each shaking movement straightens them. In association, there is a sheet-metal-guide for each belt, which serves to catch and guide the dropping dough-bars to the next belt. Each one of these sheet-metal-guides 8 has in section nearly the form of part of a parabola open towards the top, so that each dough-bar rolling over 8 receives direction growing with each inch of travel over the guide, and reaches the next belt in a prepared and proper manner. The driving roller of the last belt is arranged in such a way that the macaroni dropping from the last belt is taken up by another transporting belt which conveys it to the receptacle 86 of the finished product. This receptacle is held in place by projections 87 on the frame work 61 in such a way that it can be lifted out easily after it has been filled.

Figure 10:
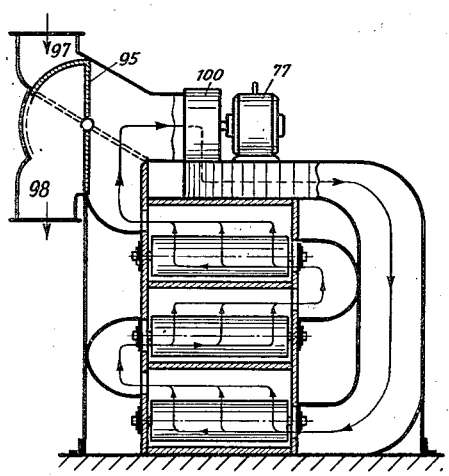
Figure 10 is a diagrammatic view for conveying the artificial air current through the belt system.
Figure 11:
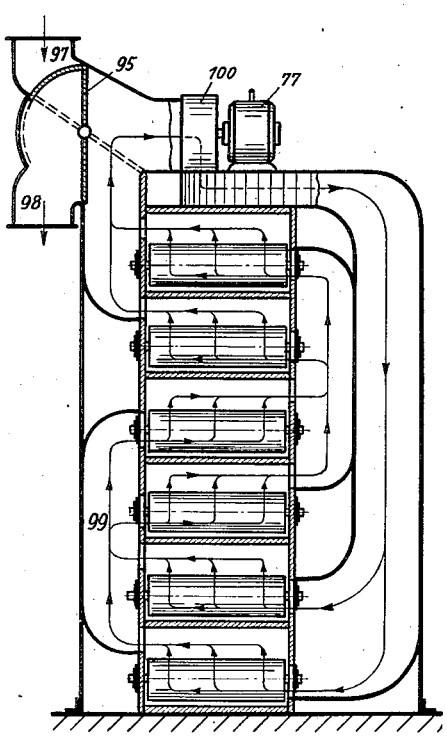
Figure 11 shows another arrangement for conducting the artificial current through the machine.
Figure 12:
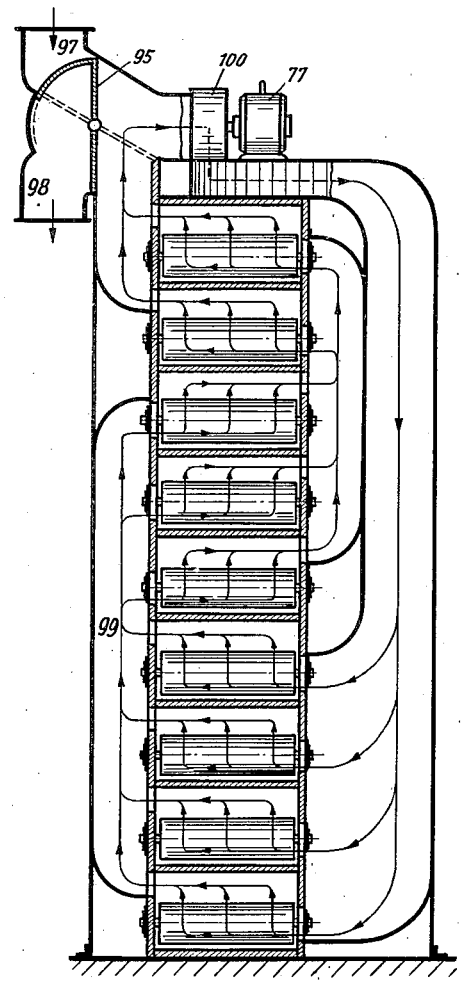
Figure 12 represents a further conducting arrangement for the air current in the machine when this has a greater number of transporting belts.

For attaining a proper conducting of the artificial air current, boards 87 are provided (see Figs. 1 and 3-5) in the frame work and both sides of the belts with an air entrance 88 and an air exit 89. In Figs. 3 and 4 two different constructions for conducting the air are shown, which may be used at will. In Fig. 4 the second and third belts from the top of Fig. 3 are reproduced on a larger scale. According to the upper part of Fig. 4 one method is shown while the other method is pictured in the lower part of Fig. 4. In the first case the artificial current of air is led at first into a chamber 90, the bottom of which is provided with nozzles which direct the air-current perpendicularly against the surface of the belt. In the second case the current of air is forced through the belt because there is no outlet opposite to the air entrance and the air is therefore required to find its way through the perforated belt, Fig. 5, and from there to the exit provided for it. A closed chamber for the circulation of air is provided around the drying-belt system by the walls 92 and 93 and a roof-plate 94. Near the air current-producing-device and at the top of the air chamber is a swinging board 95 for throttling the air current entering or leaving, which is pivoted in 96 as shown in Fig. 3. As is indicated by the arrows, the swinging board 95 controls at the same time the openings of entrance and exit of air. In this way it is possible to shunt part of the moist air through the exit while at the same time fresh air is drawn in through the entrance. Figs. 10, 11 and 12 show diagrammatic views of forms of construction, similar to that in Fig. 3, where however the current of air is not only conducted in parallel branches through the belt device, but the conduit of the air has a meandering form beginning before those belts where the material is driest and then passing in series the foregoing belts to those with the moister material. According to Fig. 10 the air current passes in series over single belts one after another. In Fig. 11 the air current is divided into two branaches which meet one another in a mixing chamber 99, after passing each one belt. They are then again divided into two branches and the same process may repeat itself a certain number of times.

Fig. 12 shows such an arrangement where the current of air is divided into 4 branches which after passing each belt, unite in the mixing chamber 99, after which the air current is divided into 3 branches which again meet in a further mixing chamber, to be once more divided into 2 branches which again are led over one belt each and finally meet in the suction chamber where the air is sucked out by the fans.

It is of special importance that the drying process, i. e. the influence of the artificial air current on the material to be dried is controlled. The factors determining this influence are:

A certain constant temperature, a certain amount of moisture, and a certain speed of the air current which is conducted to the drying arrangement from the pressure side of the air current-producing-device.

For each different kind of material to be dried, these values or constants must stand in a certain ratio, that is why according to this invention, these values are controlled and adjusted automatically as will be explained in detail on hand of Figs. 13 and 14.

Before the current of air produced by the fan 100, enters the belt system, it acts upon a measuring device 101 in accordance with its relative degree of moisture and upon a measuring device 102 in accordance with its temperature which measuring devices may be adjusted at liberty beforehand on predetermined values.

If the degree of moisture lies under the predetermined value, the measuring instrument 101 actuates the moistening device 103 by means of an electro-magnetic-device 104, in accordance with the difference from the right values.

The moistening device is formed in this case by a system of atomizing nozzles, the leading pipe of which is provided with a sliding valve 105, the moistening device however may also have any working system. If the amount of moisture is too great, the measuring instrument 101 by means of the electromagnetic regulator 106 actuates the sliding valves 95 in the casing 107 in such a way that the air which is too moist leaves in the direction of the one arrow, while simultaneously the fresh air enters in the direction of the other arrow.

If the measuring instrument 102 detects a temperature that is too high, the cooling device 109 is actuated by means of coil 110. If the temperature is too low, the heating device 111 is set to work.

In case that the outside air is relatively moister than is permitted in the drying device, there is provided in the fresh air channel a moisture meter 112, which actuates the cooling device 109 independently by means of a second winding 113. For well known reasons the moisture of the air condenses in a corresponding degree and is precipitated to the surface of the cooling device.

The control of the feeding pipe of the cooling device is designed in such a way that the maximum of efficiency may only be attained if the two actuating coils 110 and 113 work simultaneously, for otherwise an additional regulation of the temperature would not be possible by means of the cooling device 109 if this was already set to work by the moisture meter 112.

If however the entering fresh air has a temperature considerably lower than corresponds to the predetermined values in the inside of the apparatus, the moisture meter 112 will detect a value relatively too high. This value however with regard to the temperature on the outside may be such that on heating the air inside the apparatus the correct degree of moisture is detected and does not require the use of cooler 109. To insure a faultless operation, there is in the fresh air channel a further temperature meter 114 which electrically interlocks the circuit of the winding 113, if the fresh air entering lies under a certain value, so that the cooling device 109 cannot be actuated to eliminate the moisture of the fresh air.

Figure 13:
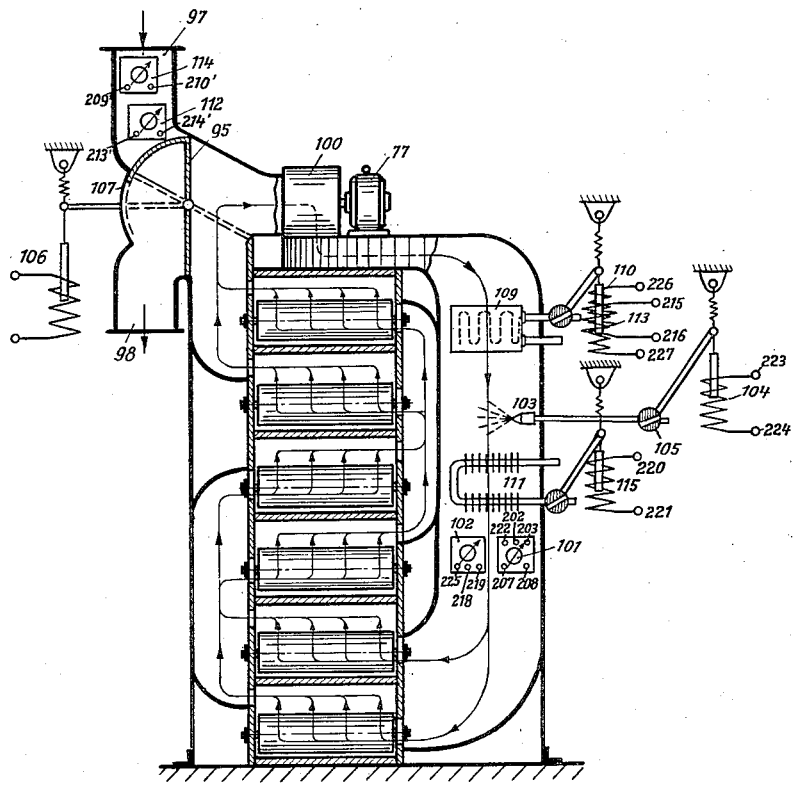
Figure 13 is a view in section like to Fig. 3 containing diagrammatically the devices and instruments for controlling and regulating automatically the temperature and the moisture of the artificial air current to be conveyed over or through the transporting belts.
Figure 14:
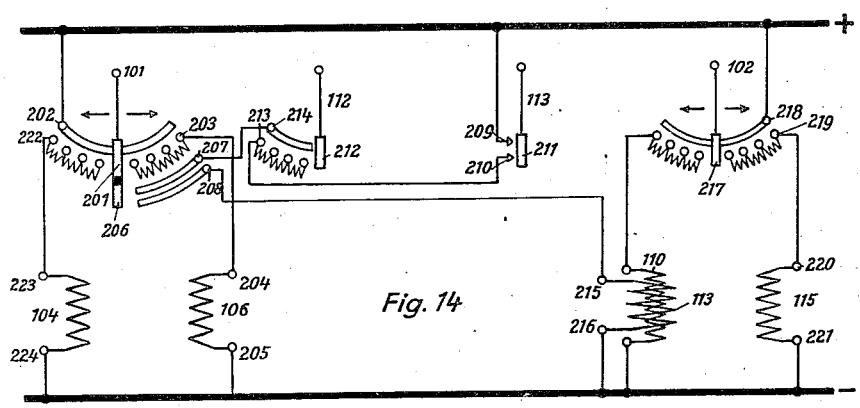
Figure 14 shows an electrical diagram for the controlling arrangement according to Fig. 13.

In Fig. 13 the connections have the same characters of reference as in Fig. 14. The measuring or detecting devices are only represented by a pivoted indicator with an electrical bridging member on its free end.

Referring to the arrows associated with the indicators 101 and 102 it may be remarked that in turning the indicator 101 in a clockwise direction the air current is moistened more and more and in turning it from the neutral position in the opposite direction the air current is dried more and more. With regard to indicator 102, turning in the clockwise direction regulates the cooling of the air current, turning in the opposite direction regulates the heating of the air current. According to Fig. 14 the bridging members are in neutral position.

Suppose the inside air is too moist, the hand 101 turns in counter clockwise direction. Thereby 201 closes the circuit for relay 106 from plus over 202, 203, 204 and 205 toward minus. As soon as 106 carries an electric current, the sliding valve 95 is adjusted, so that fresh air may be sucked in. Simultaneously with the turning of the hand of 101, the contact piece 206 being insulated against 201 bridges the contact bars connected with the terminals 207 and 208. If the temperature of the fresh air which enters lies above the value predetermined by temperature meter 114, the fixed contacts 209 and 210 remain bridged by 211. If the moisture meter 112 detects a degree of moisture too high in the fresh air current entering, its indicator turns in a clockwise direction and 212 closes the circuit of the winding 113 from plus over 209, 211, 210, 213, 212, 214, 201, 208 and 216 to minus. Thereby the cooling device is set to work to eliminate the moisture. If in this case the air current would be cooled too much by 109 before entering the drying belt system, the temperature measuring device 102 detects this condition and turns indicator 217 in a counter-clockwise direction. Its electrical bridging member closes in this way the circuit of the winding 115 in order to set to work the heating device 111 from plus over 218, 219, 220 and 221 to minus. If the different values have returned to their predetermined values the indicators or meters return also to their normal or neutral position and disconnect the actuating device, and thereby the correcting elements become ineffective, because against each electromagnetic actuating device works a set back spring.

If the air in the apparatus is too dry, the indicator 101 is turned in a clockwise direction, the circuit of winding 104 is closed from plus over 202 to 201 to 222, 223 and 224 to minus, and the moistening devices 103 are set to work until the indicator 201 is returned to its normal or neutral position.

If the air current has too high a temperature, the indicator 217 is turned from 102 in a clockwise direction and the coil 110 for the actuating of the cooling device 109 carries a current from plus over 218, 217, 225, 226 and 227 to minus, until the indicator 102 is returned to its normal position.

Figure 15:
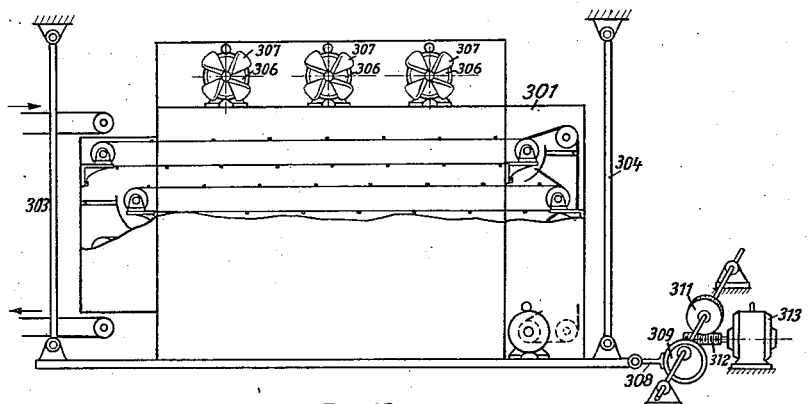
Figure 15 represents a diagrammatical view of a modification of the oscillating or shaking device.

In the shaking device shown in Fig. 15 the belt system 301 is driven at uniform speed by the motor 305 and, together with the air conducting devices formed by the motors 306 and vane wheels 307, arranged on a table 302 which is movable owing to the oscillatory rods 303 and 304. By means of the worm 312 and the worm wheel 311 the motor 313 drives the eccentric disc 309 which produces the oscillatory motion of the table 302 by means of the eccentric rod 308. Compared with the stationary parts of the drying device, the belts are simultaneously subjected to the same change in speed by the continual oscillation of the table 302.

Figure 16:
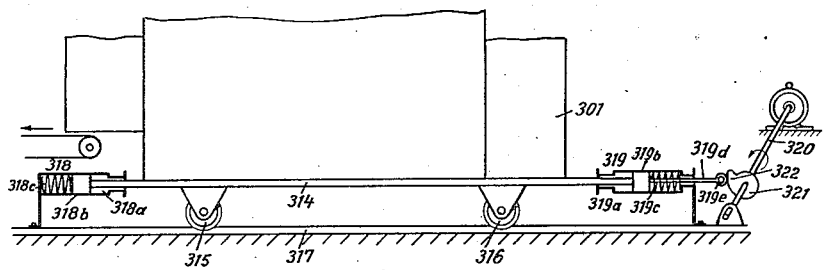
Figure 16 shows an oscillating device running on rails.

Fig. 16 shows a drying device 301 disposed on a rolling table 3% provided with the roller pairs 315 and 316 and movable on the rails 317. In the direction of motion of the table 314 and on both sides thereof the buffers 318 and 319 are respectively arranged with their pistons 318a and 319a which are guided in the cylinders 318b and 319b and supported by the springs 318c and 319c. The piston 319a is provided with a rod 319d extending through the bottom of the cylinder 319b and carrying at its free end a roll 319e. When the shaft 320 is driven, the cam 322 of the disc 321 secured to the shaft will hug the roll 319e, so that the piston 319a is displaced towards the left and thus, simultaneously, the table 314 and the piston 318a are moved also. In this way the spring 318c will be charged as energy accumulator until the roll 319e suddenly slides off from the cam 321 which is steeply inclined on one side. During this motion the buffer 319 catches the table 314 and throws it back while recharging the spring 318c until the oscillation stops owing to the damping.

Figure 17:
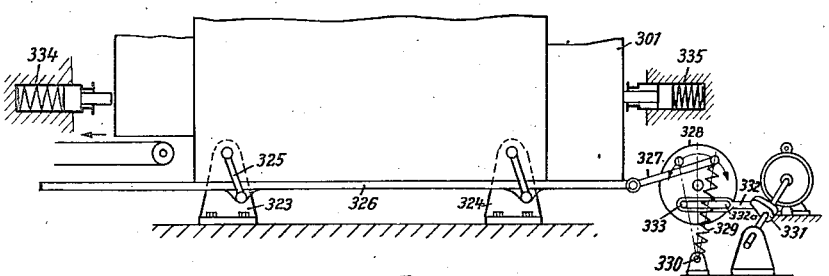
Figure 17 is a diagrammatic view of the oscillating device when using bearings arranged on the floor.

In the construction shown in Fig. 17 journal bearings 323 and 324 are used. The omitted front left bearing indicates that each bearing is provided with a crank 325 for suspending the table 326 coupled with the crank disc 328 by the rod 327. The crank disc 328 is provided with a dead point spring 329 which is secured, with initial tension, at 30 and to a suitable pin of the disc 328. Drive is transmitted from the crank 331 by the rod 332 having a recess 332a and the crank pin 333 to the disc 328. The length of the recess 332a relative to that of the crank 331 is dimensioned so that, when one end of the recess 332a has moved the crank pin 333 somewhat beyond the dead center of the crank disc 328 and spring 329, the disc 328, under the action of the spring 329, can move into end position and against a stop. In the construction shown, elastic stops 334 and 335 are used instead of rigid stops and dimensioned as to their free path that one stop cannot act on the table up to the opposite end position of the latter, the oscillation process being always and exclusively determined by the springs of the stops 334 and 335 or the spring 329.

It is obvious that various changes and modifications may be made to the details of construction without departing from the general spirit of the invention as expressed in the appended claims.

I claim:

1. In a machine for drying macaroni and other doughy material in the form of long rods or tubes means for supporting the material in the machine, means for advancing the supporting means to convey the material through the machine, means for intermittently imparting to the supporting means a sudden backward movement of less extent than the forward movement so that rolling and straightening of the macaroni occurs during passage through the machine and means for drying the material.

2. In a machine for drying macaroni and other doughy materials in the form of long rods or tubes, transporting belts, means for feeding the macaroni in plastic condition to said transporting belts with their longitudinal axes disposed transversely to the direction of motion of the belts, the macaroni covering the surface of the belts in one layer and only part of the length of the belts, means for imparting motion to the macaroni carrying surface of the belts relative to the stationary parts of the machine to cause a rolling motion of the macaroni on the carrying surface, means on the carrying surface for stopping the rolling macaroni, means for producing and guiding an artificial air current for drying the macaroni, and means for controlling the moisture content and temperature of the air current.

3. In a machine according to claim 2 an endless band for feeding plastic macaroni to the uppermost of a plurality of superposed belts with the longitudinal axis disposed transversely to the direction of motion of the carrying surface, and bars secured to the carrying faces of the belts transversely to the direction of motion of the latter to act as stops for the macaroni.

4. In a machine for drying macaroni and other doughy material in the form of long rods or tubes an endless band for feeding macaroni to the carrying surface of the uppermost of a plurality of superposed endless belts for passing the macaroni through the machine with their longitudinal axes transversely disposed to the direction of motion of the carrying surface and in one layer without covering the carrying surface over the full length thereof, guide faces between the end of the carrying surface of the superposed and the beginning of the carrying surface of the lower belt with the curvature increasing toward the underlying belt, means for imparting to the carrying surfaces of the endless bands at predetermined times motion relative to the stationary parts of the machine to cause rolling of the macaroni due to inertia with respect to the carrying surface, bars secured to the carrying surface transversely to the direction of motion thereof to act as stops for the rolling macaroni, means for producing and guiding an artificial air current for drying the macaroni, and means for controlling the moisture contents and temperature of the air current.

5. In a machine according to claim 4, rollers for the endless belts and means in the drive of the rollers to cause variations in the speed or oscillations of the endless bands.

6. In a machine according to claim 4, a driving roller for each belt, a continuous drive, a coupling between said driving roller and drive, accumulators of energy between the coupling part connected with said roller and said drive, notches suitably spaced on the coupling part rigidly connected with the roller, a lever and an energy accumulator for pressing said lever against this coupling part and, after engaging a notch, locking this coupling part until the charging of the accumulator of energy and the overpowering action of the drive.

7. In a machine according to claim 4 driving rollers for each belt, a shaft, for each roller, and a flywheel on said shaft.

8. In a machine for drying macaroni and other doughy material in the form of long rods or tubes an endless band for feeding macaroni to the carrying surface of the uppermost of a plurality of superposed endless belts for passing the macaroni through the machine with their longitudinal axes transversely disposed to the direction of motion of the carrying surface and in one layer without covering the full length of the carrying surface, guide faces between the end of the carrying surface of the superposed and the beginning of the carrying surface of the lower belt with the curvature increasing toward the underlying belt, means for imparting to the carrying surfaces of the endless bands at predetermined times motion relative to the stationary parts of the machine to cause rolling of the macaroni due to inertia with respect to the carrying surface, bars secured to the carrying surface transversely to the direction of motion thereof to act as stops for the rolling macaroni, means for producing and guiding an artificial air current for drying macaroni, means for controlling the moisture contents and temperature of the air current, rollers for the endless belts, means in the roller drive for causing variations in the speed or oscillations of the endless bands, a driving roller for each belt, a continuous drive, a coupling between said driving roller and drive, accumulators of energy between the coupling part connected with said roller and said drive, notches suitably spaced on the coupling part rigidly connected with the roller, a lever, and energy accumulator for pressing said lever against this coupling part, and a common transmitting member between the energy accumulator and the coupling members for the drive thereof.

9. In a machine according to claim 8 a sprocket connected with each driving coupling member, a sprocket at the energy source, and a common chain for all sprockets.

10. In a machine according to claim 8 a movable table for carrying the frame with the endless bands and means for driving the table so that the carrying faces of the bands, relative to the stationary parts of the machine, are subjected to the necessary variation in speed or oscillation at predetermined times.

11. In a machine according to claim 8 receptacles for receiving the macaroni from the press while still plastic, means for spreading the macaroni, and an endless band for carrying the macaroni to a drying space with their longitudinal axes disposed transversely to the direction of motion.

12. In a machine according to claim 8 a frame for receiving receptacles containing fresh macaroni, and an eccentric drive for the frame for transversely shaking the frame relative to the position of the macaroni in the receptacles, the shaking arranging the macaroni so that it can be deposited on the conveyor.

13. In a machine according to claim 8 an endless band for discharging the macaroni when dried with their longitudinal axes disposed transversely to the direction of motion, a container into which the macaroni drops from the band, a frame for insertion in the container, and an eccentric drive for the frame to shake the frame vertically to the longitudinal axis of the macaroni dropping into it.

14. In a machine according to claim 8 a plurality of fans for producing an artificial air current for drying the macaroni, said air current being guided in meandrous form transversely to the direction of motion of the superposed endless bands and passing first the lower and then the higher bands.

15. In a machine according to claim 8 a plurality of fans, a cooling device, a heating device and a moistening device on the pressure side of the fans, a hygrometer on the pressure side of the fans for actuating the moistening device and preparing for the action of the cooling device, a temperature measuring device on the pressure side of the fans for actuating the heating device and the cooling device, and a temperature measuring device and hygrometer in the suction duct for fresh air.

OTTO JOHANNES FISCHER.